United States Patent
Yu et al.

(10) Patent No.: US 9,262,025 B2
(45) Date of Patent: Feb. 16, 2016

(54) TOUCH INPUT DEVICE AND SYSTEM THEREOF

(71) Applicant: Silicon Integrated Systems Corp., Hsinchu (TW)

(72) Inventors: Mu-Tsan Yu, Hsinchu (TW); Ying-Jyh Yeh, Hsinchu (TW)

(73) Assignee: SILICON INTEGRATED SYSTEMS CORP., Hsinchu (TW)

( * ) Notice: Subject to any disclaimer, the term of this patent is extended or adjusted under 35 U.S.C. 154(b) by 65 days.

(21) Appl. No.: 14/022,684

(22) Filed: Sep. 10, 2013

(65) Prior Publication Data

US 2015/0070293 A1    Mar. 12, 2015

(51) Int. Cl.
   *G06F 3/044*    (2006.01)
   *G06F 3/0354*    (2013.01)

(52) U.S. Cl.
   CPC ............ *G06F 3/044* (2013.01); *G06F 3/03545* (2013.01)

(58) Field of Classification Search
   CPC combination set(s) only.
   See application file for complete search history.

(56) References Cited

U.S. PATENT DOCUMENTS

| | | | | |
|---|---|---|---|---|
| 2010/0123677 A1* | 5/2010 | Brown | .................. | G06F 3/0418 345/174 |
| 2011/0155479 A1* | 6/2011 | Oda | ..................... | G06F 3/03545 178/18.06 |
| 2012/0262497 A1* | 10/2012 | Chang | .................. | G09G 3/3674 345/690 |
| 2014/0015811 A1* | 1/2014 | Ji | ............................ | G06F 3/033 345/179 |
| 2014/0176495 A1* | 6/2014 | Vlasov | .................... | G06F 3/044 345/174 |

* cited by examiner

*Primary Examiner* — Gerald Johnson
*Assistant Examiner* — Robert Michaud
(74) *Attorney, Agent, or Firm* — Ladas & Parry LLP (57) ABSTRACT

A touch input device provided in the present invention includes a pen tip, a pressure sensing module, a control unit and a PWM generator. The pen tip is utilized to touch a capacitive touchscreen and conduct a touchscreen driving signal. The pressure sensing module is utilized to generate a pressure sensing signal which corresponds to a pressure of the pen tip on the capacitive touchscreen. The control unit is utilized to receive the touchscreen driving signal and the pressure sensing signal, and then to generate a PWM control signal according to the pressure sensing signal. Further, a pulse width of the PWM control signal is proportional to the pressure. The PWM generator is utilized to provide a PWM signal to the pen tip according to the PWM control signal. A touch input system is further provided in the present invention.

18 Claims, 6 Drawing Sheets

TOUCH INPUT DEVICE AND SYSTEM THEREOF

TECHNICAL FIELD OF THE INVENTION

The present invention relates to a touch input device and a system thereof, and especially to a touch input device and a system for a capacitive touchscreen.

BACKGROUND OF THE INVENTION

Touch technology can be divided into the following types: resistive, capacitive, surface acoustic wave, optics, etc according to the sensing principles thereof. With the convenience of usage and the demand for multi-touch, the capacitive touch technology inputting by fingers has become the mainstream of current electronic products.

A structure of a capacitive touch panel is a substrate on which transparent electrode patterns are coated. When a finger is close to or touches the touch panel, coupling capacitance is formed between the finger and the transparent electrode patterns because the finger is a conductor and has equivalent capacitance. Meanwhile, the capacitance of the electrode pattern positioned at a touch point on the touch panel will change, thus making the voltage or the current in the electrode change. Then by comparing a voltage difference between the electrode and the adjacent electrodes, the position of the touch point can thus be calculated.

However, although the touch input by the fingers is convenient, it is obviously difficult to achieve the following requirements: depicting lines with various thicknesses on the touchscreen, or touch recognition for fine locations by using the fingers. Therefore, in order to increase the accuracy of the touch input, a solution of using a stylus pen has been proposed. However, the input principle of a conventional capacitive stylus pen is mostly by disposing conductive plastic or conductive rubber on one end of a metal tube of the pen. Although it can achieve a more accurate input than the finger input, the capacitive stylus pen also can not depict the lines with the various thicknesses on the screen corresponding to force that exerts to the pen, the shortcoming of the usage still existing.

Accordingly, in order to represent the line with the various thicknesses on the screen, an active stylus pen that adopts Bluetooth or other wireless communication module to communicate with a tablet computer was suggested for achieving the above purpose. However, the establishment of the wireless communication will waste the active stylus pen and the tablet computer more power, and it is a disadvantage to the using time for both.

SUMMARY OF THE INVENTION

Accordingly, an objective of the present invention is to provide a touch input device, which is capable of emitting a pulse width modulation (PWM) signal to influence an original touchscreen driving signal through a pen tip, so that a capacitive touchscreen can identify the force that exerts to the pen based on the influenced driving signal.

Another objective of the present invention is to provide a touch input system, which is capable of emitting the PWM signal to influence an original touchscreen driving signal through a pen tip, so that the capacitive touchscreen can determine the line thicknesses displayed on the capacitive touchscreen based on the influenced driving signal.

To achieve the foregoing objectives, according to an aspect of the present invention, the present invention provides a touch input device, which is utilized to perform an input on a capacitive touchscreen. The touch input device includes a pen tip, a pressure sensing module, a control unit and a PWM generator. The pen tip is utilized to touch the capacitive touchscreen and conduct a touchscreen driving signal. The pressure sensing module is electrically coupled to the pen tip and utilized to generate a pressure sensing signal, which corresponds to a pressure of the pen tip on the capacitive touchscreen. The control unit is utilized to receive the touchscreen driving signal and the pressure sensing signal, and then to generate a PWM control signal according to the pressure sensing signal. Further, a pulse width of the PWM control signal is proportional to the pressure. The PWM generator is electrically coupled between the control unit and the pen tip, and utilized to provide a PWM signal to the pen tip according to the PWM control signal.

In one preferred embodiment, the PWM signal has a level inversion with respect to the PWM control signal.

In one preferred embodiment, the PWM signal is utilized to form a voltage difference from the touchscreen driving signal. Moreover, the voltage difference is larger than a threshold voltage drop. In addition, the pulse width is larger than a threshold pulse width, and the threshold pulse width corresponds to the threshold voltage difference.

In one preferred embodiment, the pen tip has a receiving end which is located around a tip for receiving the touchscreen driving signal, and has a transmitting end which is located at the tip for emitting the PWM signal.

In one preferred embodiment, the touch input device further includes an amplifier. The amplifier is disposed between the receiving end and the control unit, and is utilized to amplify the touchscreen driving signal. Also, the amplifier is electrically coupled between the pressure sensing module and the control unit, and is utilized to amplify the pressure sensing signal.

In one preferred embodiment, the control unit has a comparator which is utilized to compare a voltage of the amplified touchscreen driving signal with a threshold voltage. When the voltage of the amplified touchscreen driving signal is larger than the threshold voltage, the control unit begins to generate the PWM control signal.

In one preferred embodiment, the PWM generator includes a charge pump circuit and a switching circuit. The charge pump circuit has an output for providing a predetermined voltage value. Preferably, the predetermined voltage value is between 10V and 20V. The switching circuit is coupled between the output and a ground for turning on and turning off a connection between the output and the ground according to the PWM control signal.

To achieve the another objective mentioned above, the present invention provides a touch input system, which is includes a capacitive touchscreen and a stylus pen. The capacitive touchscreen has a touch controller which is utilized to emit a touchscreen driving signal. The stylus pen is utilized to perform an input on the capacitive touchscreen. The stylus pen includes a pen tip, a pressure sensing module, a control unit and a PWM generator. The pen tip is utilized to touch the capacitive touchscreen and conduct the touchscreen driving signal into the stylus pen. The pressure sensing module is electrically coupled to the pen tip and utilized to generate a pressure sensing signal, which corresponds to a pressure of the pen tip on the capacitive touchscreen. The control unit is utilized to receive the touchscreen driving signal and the pressure sensing signal, and then to generate a PWM control signal according to the pressure sensing signal. Further, a pulse width of the PWM control signal is proportional to the pressure. The PWM generator is electrically coupled between the control unit and the pen tip, and utilized to provide a PWM signal to the pen tip according to the PWM control signal.

In one preferred embodiment, the PWM signal is utilized to form a voltage difference from the touchscreen driving signal. Moreover, the touch controller receives the touchscreen driving signal with the voltage difference. The voltage difference is larger than a threshold voltage difference, which is utilized to make the touch controller detect a touch position.

In one preferred embodiment, the touch input system further includes a thickness determination unit. The thickness determination unit, which is electrically coupled to the touch controller, is utilized to determine a thickness of a line displayed on the capacitive touchscreen according to a value of the voltage difference minus the threshold voltage difference. Specifically, the thickness of the line is proportional to the pressure.

In comparison with the prior art, the present invention employs a duty cycle of the PWM signal to control the voltage difference, thereby affecting the strength of the driving signal received by the touch controller, so as to achieve the touch effect of pressure-sensitive feedback.

It is to be understood that both the foregoing general description and the following detailed description of the present invention are exemplary and explanatory and are intended to provide further explanation of the invention as claimed.

DETAILED DESCRIPTION OF THE INVENTION

The present invention will now be described in detail with reference to a few preferred embodiments thereof as illustrated in the accompanying drawings. The same reference numerals refer to the same parts or like parts throughout the various figures.

Figure 1:
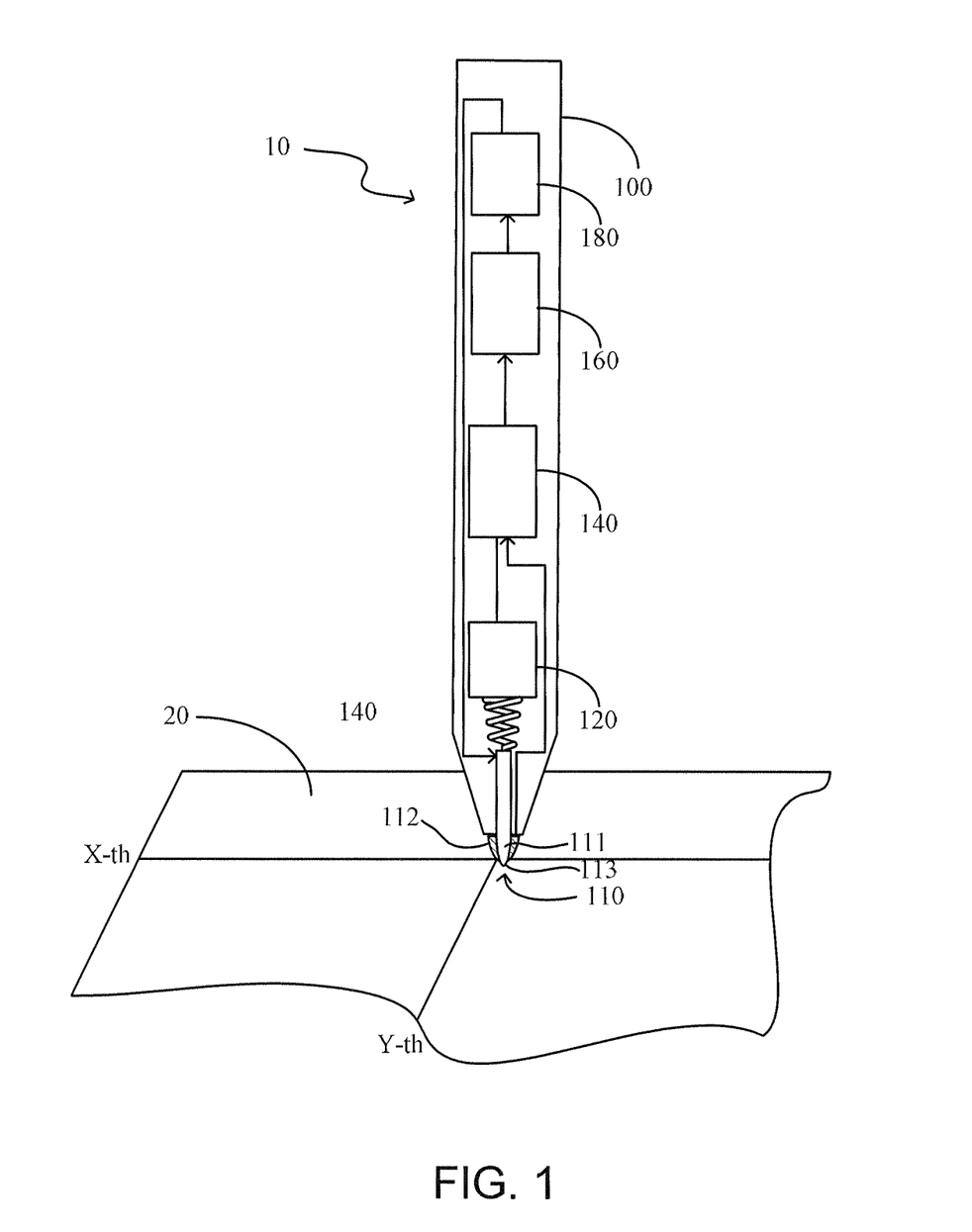
FIG. 1 is a perspective view schematically illustrating a touch input device according to a preferred embodiment of the present invention.
Figure 2:
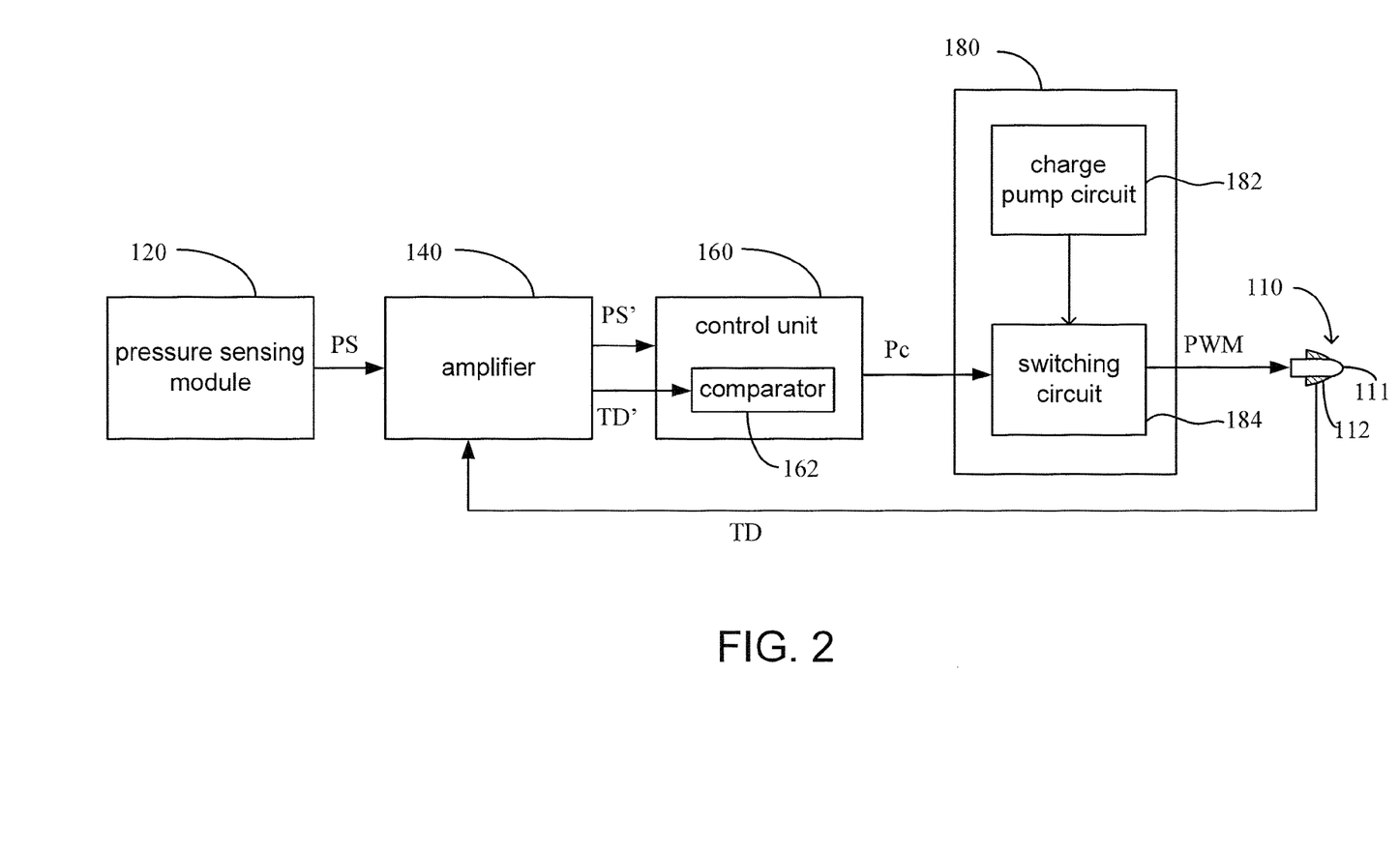
FIG. 2 is a block diagram illustrating a touch input device according the preferred embodiment of the present invention.

Referring to FIG. 1 and FIG. 2, FIG. 1 is a perspective view schematically illustrating a touch input device according to a preferred embodiment of the present invention; FIG. 2 is a block diagram illustrating a touch input device according the preferred embodiment of the present invention. The touch input device 10 of the embodiment is utilized to perform an input on a capacitive touchscreen 20. Preferably, the touch input device 10 can be an active stylus pen 100, which equips with a battery (not shown) to supply electric power as desired. As shown in FIG. 1, the touch input device 10 includes a pen tip 110, a pressure sensing module 120, an amplifier 140, a control unit 160 and a pulse width modulation (PWM) generator 180.

The pen tip 110 is utilized to touch the capacitive touchscreen 20 and conduct a touchscreen driving signal TD. The touchscreen driving signal TD can be a charging signal transmitted from/received by a touch controller (not shown) of the capacitive touchscreen 20 for an X-th stripe electrode and a Y-th stripe electrode. In the embodiment, the pen tip 110 is made of conductor. The pen tip 110 has a receiving end 112 that is located around a tip 111 for receiving the touchscreen driving signal TD, and has a transmitting end 113 that is located at the tip 111.

As shown in FIG. 1 and FIG. 2, the pressure sensing module 120 is electrically coupled to the pen tip 110 and utilized to generate a pressure sensing signal PS, which corresponds to a pressure of the pen tip 110 on the capacitive touchscreen 20. Specifically, the pressure sensing module 120 can be disposed at the rear end of the tip 111 for real-time detecting a change of the pressure. Preferably, the pressure sensing module 120 can be a piezoelectric, resistance, or infrared pressure sensor. The amplifier 140 is electrically coupled between the pressure sensing module 120 and the control unit 160, and is utilized to amplify the pressure sensing signal PS. Meanwhile, the amplifier 140 is disposed between the receiving end 112 and the control unit 160, and is utilized to amplify the touchscreen driving signal TD.

Figure 3:
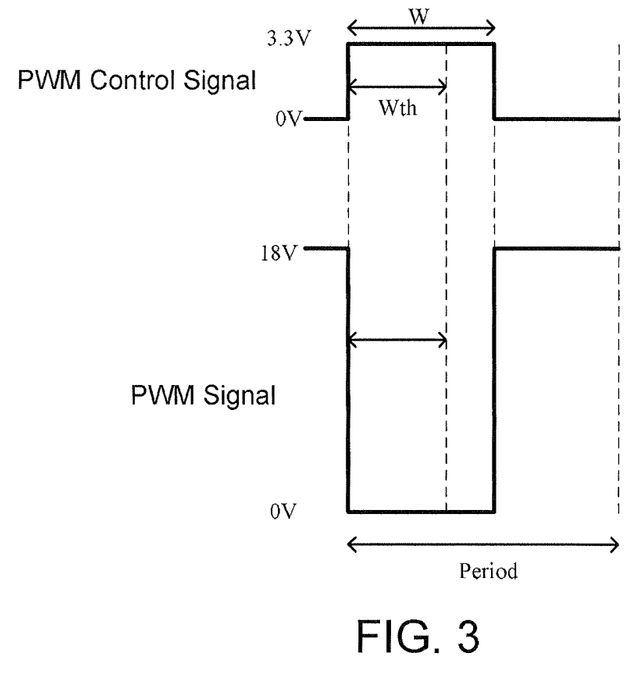
FIG. 3 is a schematic drawing illustrating waveforms of a PWM control signal and a PWM signal.

Referring to FIG. 2 and FIG. 3, FIG. 3 is a schematic drawing illustrating waveforms of a PWM control signal and a PWM signal. The control unit 160 is utilized to receive the amplified touchscreen driving signal TD' and the amplified pressure sensing signal PS', and then to generate a PWM control signal Pc which is a periodic pulse signal according to the amplified pressure sensing signal PS'. Further, a pulse width W of the PWM control signal Pc is proportional to the pressure.

As shown in FIG. 2, the PWM generator 180 is electrically coupled between the control unit 160 and the pen tip 110 (especially the tip 111), and utilized to generate a PWM signal (PWM) to the pen tip according to the PWM control signal Pc. As shown in FIG. 3, the PWM signal has a level inversion with respect to the PWM control signal. That is to say, when the PWM control signal is on a high level, the PWM signal is on a low level; when the PWM control signal is on a low level, the PWM signal is on a high level. The transmitting end 113 is used for emitting the PWM signal to influence the charging signal received by the touch controller for the X-th stripe electrode and the Y-th stripe electrode.

Figure 4:
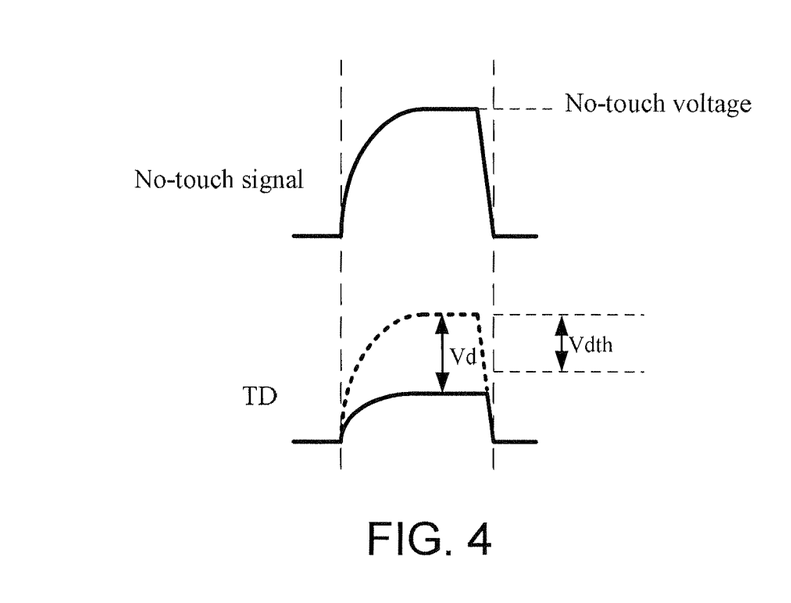
FIG. 4 is a schematic drawing illustrating a waveform of a touchscreen driving signal received by a touch controller of a capacitive touchscreen.

Specifically, referring to FIG. 4, FIG. 4 is a schematic drawing illustrating a waveform of the touchscreen driving signal received by the touch controller of the capacitive touchscreen. The PWM signal is utilized to make the touchscreen driving signal ID form a voltage difference Vd from a no-touch voltage. Thus, the touch controller receives the touchscreen driving signal TD with the voltage difference Vd. It is worth mentioning that the voltage difference Vd is larger than a threshold voltage difference Vdth. The threshold voltage difference Vdth is a minimal voltage for the touch controller to detect a touch position. That is to say, when the touch controller receives the touchscreen driving signal TD having a voltage difference Vd exceeding the threshold voltage difference Vdth, the position (X, Y) is determined as a touch point.

Referring to FIG. 3 and FIG. 4, in order to form the voltage difference Vd, the pulse width W is larger than a threshold pulse width Wth, and the threshold pulse width Wth corresponds to the threshold voltage difference Vdth. That is, the voltage difference Vd of the touchscreen driving signal TD can be controlled through a duration (i.e. 1-duty cycle) of the low level within the period of the PWM signal. In general, the voltage difference Vd is proportional to the pulse width W. More specifically, the threshold pulse width Wth is a minimal width that the voltage difference Vd of the touchscreen driving signal ID reaches the threshold voltage difference Vdth.

From the foregoing, because the pulse width W is proportional to the pressure, the wider the pulse width W, the larger the voltage difference Vd of the touchscreen driving signal TD is. Accordingly, the touch controller is capable of determining measurements of the pressure of the pen tip 110 according measurements of the voltage difference Vd.

It is worth mentioning that the control unit 160 can be a microcontroller. Moreover, the control unit 160 has a comparator 162 that is utilized to compare a voltage of the amplified touchscreen driving signal TD' with a threshold voltage (not shown). When the voltage of the amplified touchscreen driving signal TD' is larger than the threshold voltage, the control unit 160 begins to generate the PWM control signal Pc. Specifically, the comparator 162 is utilized to confirm whether the pen tip 110 touches the capacitive touchscreen 20, if so, then beginning to generate the PWM control signal Pc for the pressure-sensitive feedback.

Figure 5:
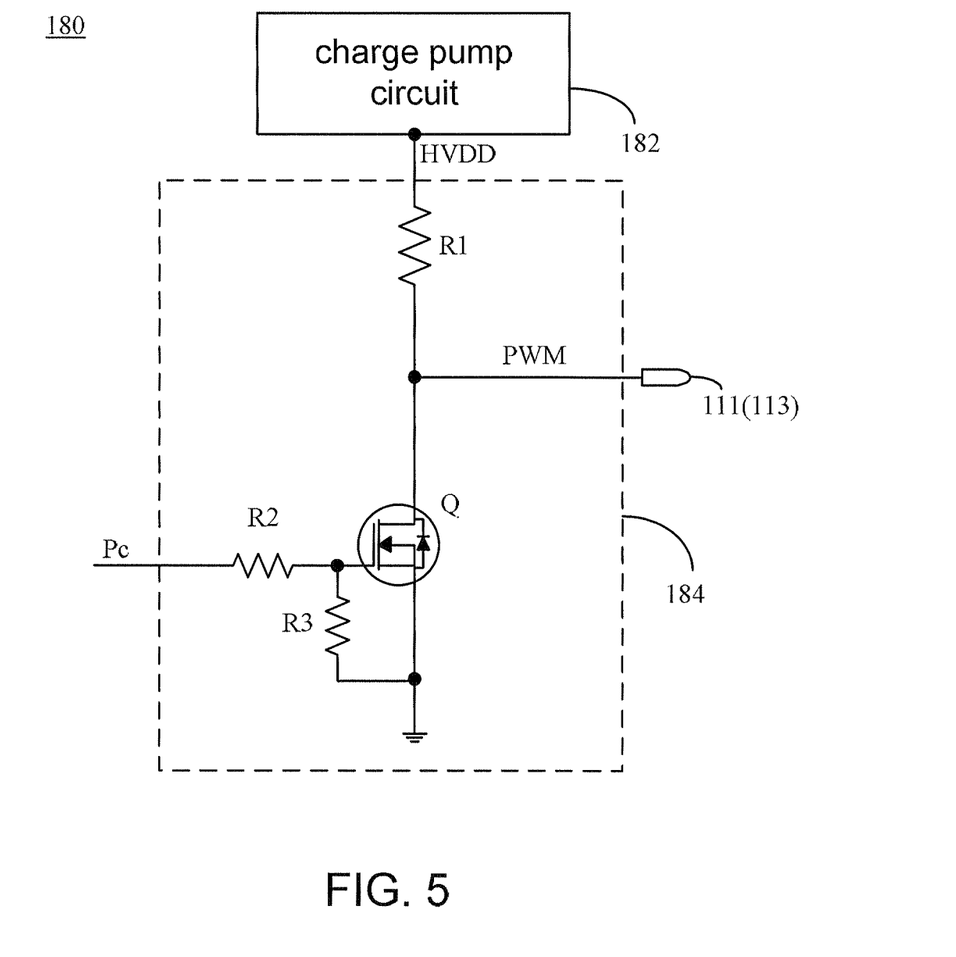
FIG. 5 is a schematic drawing illustrating a circuit of the PWM generator.

The PWM generator 180 will be explained in the following. Referring to FIG. 5, FIG. 5 is a schematic drawing illustrating a circuit of the PWM generator. The PWM generator 180 includes a charge pump circuit 182 and a switching circuit 184. The charge pump circuit 182 is utilized to boost the voltage (e.g. 1.5V) of the battery to a high voltage. Specifically, the charge pump circuit 182 has an output HVDD for providing a predetermined voltage value. Preferably, the predetermined voltage value is between 10V and 20V. In the embodiment, the predetermined voltage value is 18V. The switching circuit 184 is coupled between the output HVDD and a ground for turning on and turning off a connection between the output HVDD and the ground according to the PWM control signal Pc, so that the tip 111 receives the PWM signal and then outputs the PWM signal. More specifically, the switching circuit 184 has a transistor Q. When the PWM control signal Pc is on the high level, the transistor Q is in an ON state. Under this condition, the tip 111 is grounded (0V). When the PWM control signal Pc is on the low level, the transistor Q is in an OFF state. Under this condition, the voltage of the tip 111 is the predetermined voltage value (18V).

Figure 6:
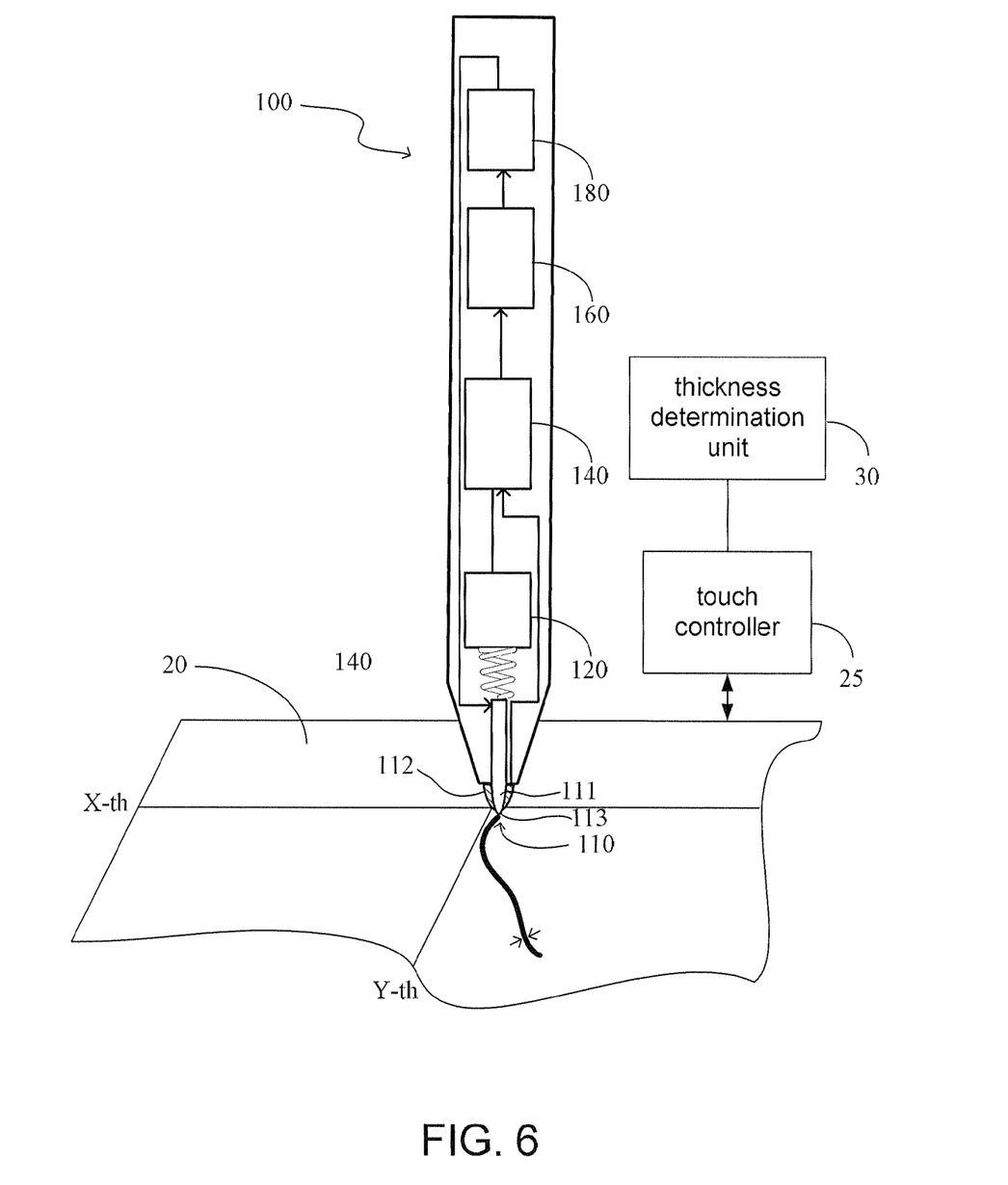
FIG. 6 is a perspective view schematically illustrating a touch input system according to a preferred embodiment of the present invention.
Figure 7:
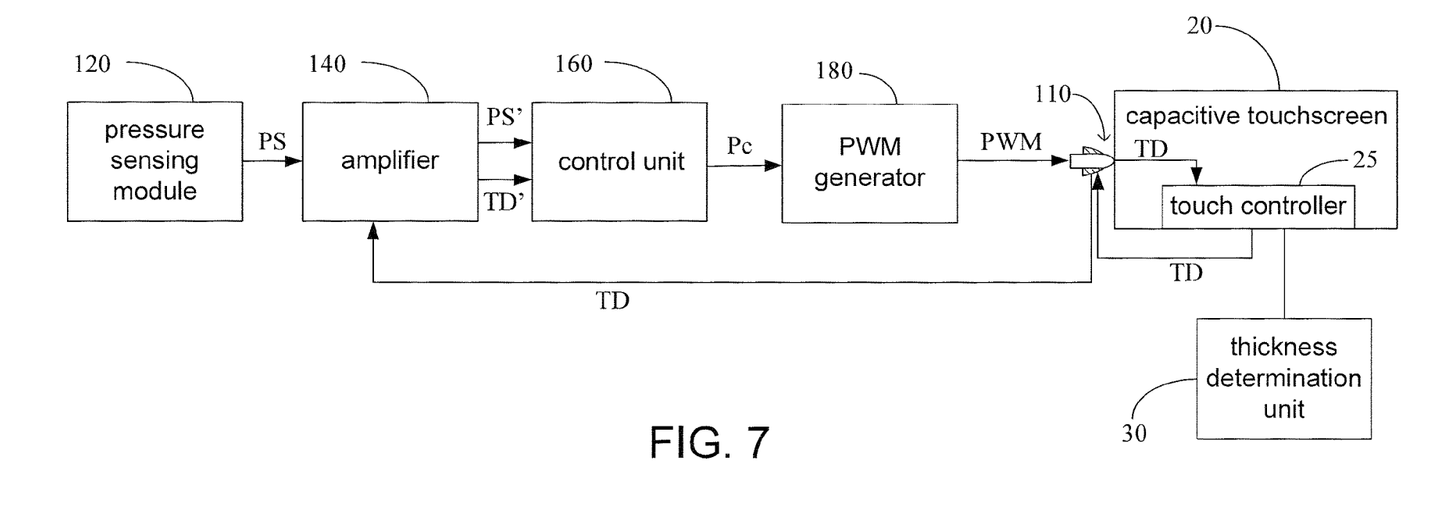
FIG. 7 is a block diagram illustrating a touch input system according the preferred embodiment of the present invention.

The touch input system employing the touch input device 10 will be explained in the following. Referring to FIG. 6 and FIG. 7, FIG. 6 is a perspective view schematically illustrating a touch input system according to a preferred embodiment of the present invention; FIG. 7 is a block diagram illustrating a touch input system according the preferred embodiment of the present invention. The touch input system 1 of the embodiment includes a capacitive touchscreen 20, a stylus pen 100 and a thickness determination unit 30. The capacitive touchscreen 20 has a touch controller 25 which is utilized to emit and receive a touchscreen driving signal TD. Similarly, the stylus pen 100 is utilized to perform an input on the capacitive touchscreen 20. The stylus pen 100 includes a pen tip 110, a pressure sensing module 120, an amplifier 140, a control unit 160 and a PWM generator 180.

As shown in FIG. 7, The pen tip 110 is utilized to touch the capacitive touchscreen 20 and conduct the touchscreen driving signal TD into the stylus pen 100. As mentioned above, the pressure sensing module 120 is electrically coupled to the pen tip 110 and utilized to generate a pressure sensing signal PS, which corresponds to a pressure of the pen tip 110 on the capacitive touchscreen 20. The control unit 160 is utilized to receive the amplified touchscreen driving signal TD' and the amplified pressure sensing signal PS', and then to generate a PWM control signal Pc according to the amplified pressure sensing signal PS'. Referring to FIG. 3 again, the pulse width W of the PWM control signal Pc is proportional to the pressure. The PWM generator 180 is electrically coupled between the control unit 160 and the pen tip 110, and utilized to provide a PWM signal to the pen tip 110 according to the PWM control signal Pc. The descriptions of these elements have been explained as above mention, so no further detail will be provided herein.

Similarly, referring to FIG. 4, the PWM signal is utilized to form a voltage difference Vd from the touchscreen driving signal ID. As shown in FIG. 7, the touch controller 25 receives the touchscreen driving signal ID with the voltage difference Vd. Also, the voltage difference Vd is larger than the threshold voltage difference Vdth, which is utilized to make the touch controller 25 detect a touch position (X, Y).

As shown in FIG. 6, the thickness determination unit 30, which is electrically coupled to the touch controller 25, is utilized to determine a thickness of a line displayed on the capacitive touchscreen 20 according to a value of the voltage difference Vd minus the threshold voltage difference Vdth (i.e. Vd–Vdth). Specifically, the value of Vd–Vdth may be converted to a digital value by an ADC (Analog Digital Converter) which is disposed in the touch controller 25. The thickness determination unit 30 determines the line thickness based on the digital value. More specifically, the line thickness is proportional to the pressure, thereby achieving the objective of the thickness of the line being corresponding to the force that exerts to the pen. It is worth mentioning that the thickness determination unit 30 can be implemented by application software existing in a terminal of a host computer or a firmware existing in the touch controller 25. Therefore, hardware of the capacitive touchscreen 20 doesn't have to be changed.

In summary, the present invention employs the duty cycle of the PWM signal to control the voltage difference Vd, thereby affecting the strength of the driving signal received by the touch controller 25, so as to achieve the touch effect of pressure-sensitive feedback.

While the preferred embodiments of the present invention have been illustrated and described in detail, various modifications and alterations can be made by persons skilled in this art. The embodiment of the present invention is therefore described in an illustrative but not restrictive sense.

What is claimed is:

1. A touch input device for performing an input on a capacitive touchscreen, comprising:
   a pen tip utilized to touch the capacitive touchscreen and conduct a touchscreen driving signal;
   a pressure sensing module electrically coupled to the pen tip, utilized to generate a pressure sensing signal, which corresponds to a pressure of the pen tip on the capacitive touchscreen;
   a control unit utilized to receive the touchscreen driving signal and the pressure sensing signal, and then to generate a pulse width modulation (PWM) control signal according to the pressure sensing signal, wherein a pulse width of the PWM control signal is proportional to the pressure; and
   a PWM generator electrically coupled between the control unit and the pen tip, utilized to provide a PM signal to the pen tip according to the PWM control signal, wherein the PWM signal is utilized to make the touchscreen driving signal have a voltage difference according to a duty cycle of the PWM signal for position and pressure detection by measurement of the voltage difference.

2. The touch input device of claim 1, wherein the PWM signal has a level inversion with respect to the PWM control signal.

3. The touch input device of claim 1, wherein the voltage difference is larger than a threshold voltage difference.

4. The touch input device of claim 3, wherein the pulse width is larger than a threshold pulse width, and the threshold pulse width corresponds to the threshold voltage difference.

5. The touch input device of claim 1, wherein the pen tip has a receiving end located around a tip for receiving the touchscreen driving signal, and has a transmitting end located at the tip for emitting the PWM signal.

6. The touch input device of claim 3, further comprising an amplifier disposed between the receiving end and the control unit, utilized to amplify the touchscreen driving signal.

7. The touch input device of claim 6, wherein the amplifier is electrically coupled between the pressure sensing module and the control unit, and utilized to amplify the pressure sensing signal.

8. The touch input device of claim 7, wherein the control unit has a comparator which is utilized to compare a voltage of the amplified pressure sensing signal with a threshold voltage.

9. The touch input device of claim 8, wherein the control unit begins to generate the PWM control signal when the voltage of the amplified touchscreen driving signal is larger than the threshold voltage.

10. The touch input device of claim 1, wherein the PWM generator comprises:
    a charge pump circuit having an output for providing a predetermined voltage value; and
    a switching circuit coupled between the output and a ground for turning on and turning off a connection between the output and the ground according to the PWM control signal.

11. The touch input device of claim 10, wherein the predetermined voltage value is between 10V and 20V.

12. A touch input system, comprising:
    a capacitive touchscreen having a touch controller, which is utilized to emit a touchscreen driving signal; and
    a stylus pen utilized to perform an input on the capacitive touchscreen, the stylus pen comprising:
        a pen tip utilized to touch the capacitive touchscreen and conduct the touchscreen driving signal into the stylus pen;
        a pressure sensing module electrically coupled to the pen tip, utilized to generate a pressure sensing signal, which corresponds to a pressure of the pen tip on the capacitive touchscreen;
        a control unit utilized to receive the touchscreen driving signal and the pressure sensing signal, and then to generate a PWM control signal according to the pressure sensing signal, wherein a pulse width of the PWM control signal is proportional to the pressure; and
        a pulse width modulation (PWM) generator electrically coupled between the control unit and the pen tip, utilized to provide a PWM signal to the pen tip according to the PWM control signal, wherein the PWM signal is utilized to make the touchscreen driving signal have a voltage difference according to a duty cycle of the PWM signal for position and pressure detection by the touch controller by measurement of the voltage difference.

13. The touch input device of claim 12, wherein the touch controller receives the touchscreen driving signal with the voltage difference.

14. The touch input device of claim 13, wherein the voltage difference is larger than a threshold voltage difference, which is utilized to make the touch controller detect a touch position.

15. The touch input system of claim 14, further comprising a thickness determination unit electrically coupled to the touch controller, utilized to determine a thickness of a line displayed on the capacitive touchscreen according to a value of the voltage difference minus the threshold voltage difference.

16. The touch input system of claim 15, wherein the thickness of the line is proportional to the pressure.

17. The touch input system of claim 14, wherein the pulse width is larger than a threshold pulse width, and the threshold pulse width corresponds to the threshold voltage difference.

18. The touch input system of claim 12, wherein the pen tip has a receiving end located around a tip for receiving the touchscreen driving signal, and has a transmitting end locate: at the tip for emitting the PWM signal.

* * * * *